United States Patent [19]

Setzer, Sr.

[11] Patent Number: 4,865,731
[45] Date of Patent: Sep. 12, 1989

[54] PRE-FILLED FUEL FILTER FOR INTERNAL COMBUSTION ENGINES

[75] Inventor: Robert D. Setzer, Sr., Lenoir, N.C.

[73] Assignee: Beall Oil Company, Lenoir, N.C.

[21] Appl. No.: 168,501

[22] Filed: Mar. 15, 1988

[51] Int. Cl.$^4$ ............................................. B01D 35/02
[52] U.S. Cl. .................................... 210/232; 210/232;
210/238; 210/248; 210/443; 210/DIG. 17;
220/86 R; 220/200
[58] Field of Search ....... 210/232, 238, 248, DIG. 17,
210/168, 416.4, 440, 443; 220/86 R, 86 NR,
200, 254

[56] References Cited

U.S. PATENT DOCUMENTS

| | | | |
|---|---|---|---|
| 3,912,633 | 10/1975 | Delaney | 210/DIG. 17 |
| 4,451,368 | 5/1984 | Pandelena et al. | 210/248 |
| 4,507,199 | 3/1985 | Carlisle | 210/248 |
| 4,574,972 | 3/1986 | Saha | 210/136 |

*Primary Examiner*—W. Gary Jones
*Assistant Examiner*—Wanda L. Millard
*Attorney, Agent, or Firm*—Shefte, Pinckney & Sawyer

[57] ABSTRACT

A pre-filled fuel filter assembly for internal combustion engines includes a filter cartridge containing a requisite quantity of fuel necessary for filter installation and a removable cap sealably enclosing the cartridge, to enable the filter cartridge to be simply and readily installed as a replacement fuel filter in the event of an engine breakdown without requiring transportation of the engine to an available source of fuel supply.

4 Claims, 1 Drawing Sheet

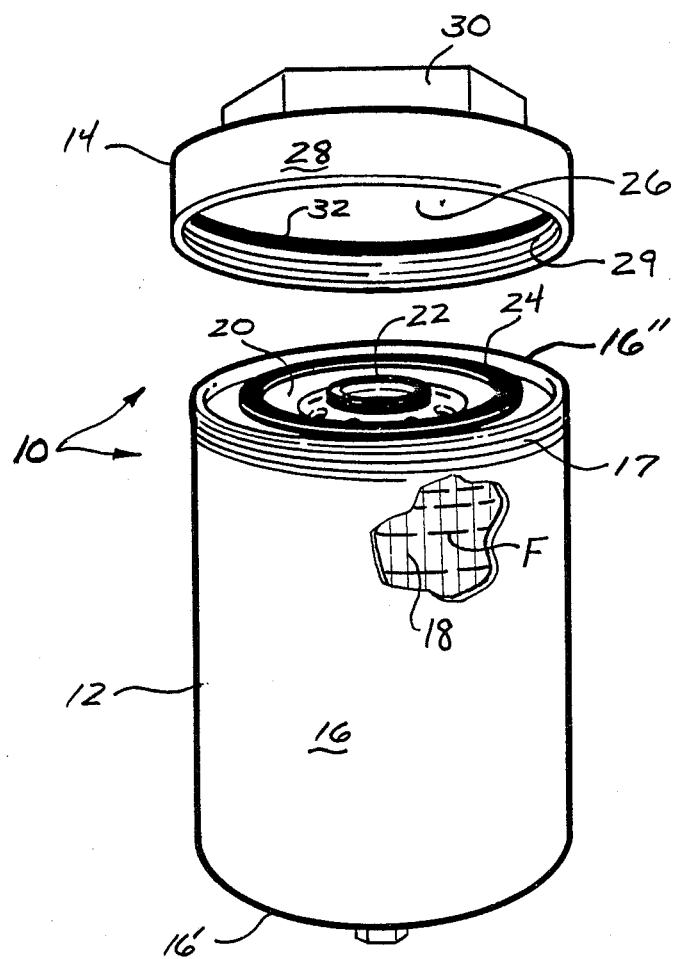

PRE-FILLED FUEL FILTER FOR INTERNAL COMBUSTION ENGINES

BACKGROUND OF THE INVENTION

The present invention relates generally to fuel filters for internal combustion engines and, more particularly, to a pre-filled fuel filter adapted to be readily installed when necessary without requiring an available source of supply of fuel.

Conventional diesel-fuel internal combustion engines of the type utilized in commerical trucks and the like utilize a replaceable fuel filter basically comprising an outer filter casing containing suitable filtering material and defining an internal fuel flow path through the filter material for separating water, debris and other contaminants and the like from the engine's fuel supply as it is delivered to the engine for operation. During the winter months particularly, such fuel filters may be subject to premature failure when cold conditions cause water separated by the filter to freeze, resulting in a breakdown of the engine's normal operation. Replacement of the fuel filter is required under such circumstances in order to return the engine to normal service. As is known, the installation of a suitable replacement filter requires that the new filter be initially with a suitable quantity of fuel to prevent occurrence of a vapor lock in the fuel delivery system. This procedure, of course, presents no particular problems when carried out at a normal engine service facility having a readily available supply of fuel. However, engine breakdowns of the aforementioned type normally do not conveniently occur at or near such facilities and, accordingly, when a fuel filter-related engine breakdown occurs while a truck is in normal road operation, it is necessary for the operator to call a tow truck to transport the broken-down vehicle to a service facility to carry out the otherwise simple replacement of the fuel filter. As will thus be understood, such relatively minor fuel filter-related breakdowns often result in the loss of many hours of truck service and a corresponding loss in operating revenues.

SUMMARY OF THE INVENTION

It is accordingly an object of the present invention to provide a pre-filled fuel filter assembly for internal combustion engines and the like which avoids the necessity of an available source of supply of fuel for filter installation.

Briefly summarized, the pre-filled fuel filter of the present invention comprises a filter casing containing filter material and a predetermined quantity of fuel necessary for installation of the filter, with a removable cover sealably enclosing the filter casing to contain the fuel therein. Thus, the fuel filter may be readily installed at any time and any location when necessary, even in the event of an engine breakdown away from a normal service facility.

According to the preferred embodiment of the present invention, the filter casing has an open end and the cover is a cap fitted to the casing sealably covering its open end. Preferably, the cap may be threadedly engaged to the casing about its open end. As necessary, the cap or other cover may include a seal for engaging the filter casing to sealably contain the fuel quantity therein.

BRIEF DESCRIPTION OF THE DRAWING

The accompanying drawing is an exploded pespective view of a pre-filled fuel filter assembly according to the preferred embodiment of the present invention.

DESCRIPTION OF THE PREFERRED EMBODIMENT

Referring now to the accompanying drawing, a pre-filled fuel filter assembly according to the preferred embodiment of the present invention is shown generally at 10 and basically comprises a fuel filter cartridge 12 fitted with a cover member 14, preferably in the form of a cap. The cartridge 12 is of a generally conventional construction of the basic type having a cylindrical outer casing 16 closed at one axial end 16' and open at the opposite axial end 16''. A suitable filter material 18, such as a pleated paper annulus, is positioned within the casing 16 and a suitable baffle arrangement, such as the end plate 20 is positioned at the open end 16'' of the casing 16 to direct fuel entering the filter to flow radially through the filter material and then outwardly through the open end of the casing. Annular gaskets 22,24 are provided on the end plate 20 to separate the intake and outflow fuel paths of the filter cartridge 12.

The cap 14 has a substantially circular body 26 with a continuous lip or flange 28 extending essentially perpendicularly from the periphery of the body 26 to fit snugly about the open end 16'' of the filter casing 16. Preferably, the flange 28 of the cap 14 is provided with interior threads 29 and the exterior surface of the filter casing 16 is modified to provide compatible threads 17 adjacent the open end 16'' to provide a secure fluid-tight sealed engagement between the cap 14 and the casing 16. Of course, those persons skilled in the art will readily recognize that other means of sealable engagement of the cap 14 in removable covering relation to the open end 16'' of the casing 16 are possible and, accordingly, the present invention is not limited to the particular preferred form of threaded engagement. The outward face of the circular body 26 is provided with a hexagonal projection 30 by which the cap may be tightened and untightened with respect to the filter casing 16. When the cap 14 is secured on the filter cartridge 12, the interior surface of the circular cap body 26 will sealably contact the outer gasket 24 so as to sealably enclose the interior of the filter cartridge 12. As necessary or desirable, the cap 14 may be additionally provided with another annular gasket, as representatively shown at 32, to provide an additional safety seal between the cap 14 and the cartridge 12.

According to the present invention, the filter cartridge 12 is pre-filled with the requisite quantity of fuel, as indicated at F, as would be necessary to facilitate proper installation of the filter cartridge 12 on a compatible internal combustion engine (not shown), following which the cap 14 is secured on the casing 16 of the filter cartridge 12 to contain the fuel within the cartridge 12 until such time that installation of the cartridge 12 becomes necessary. The pre-filled filter assembly 10 may thus be carried on a truck or other piece of equipment having an internal combustion engine for which the filter cartridge 12 is suited for use. If and when a breakdown of the engine's existing fuel filter occurs, the cap 14 of the stored filter assembly 12 may be readily removed from the filter cartridge 12 to enable simple and ready installation of the cartridge 12 to be carried out by the operator. Advantageously, the necessity of towing or otherwise transporting the truck or other equipment to a service facility for installation of a replacement fuel filter is entirely avoided, thereby also avoiding any significant loss of operating time and operating revenues.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A pre-filled fuel filter assembly for internal combustion engines comprising a filter cartridge comprising an annular outer casing closed at one axial end and open at the other axial end defining a cavity containing filter material and a predetermined quantity of fuel necessary for installation of said filter cartridge and removable cover means at said open end of said casing sealably enclosing said cavity in its entirety to contain said fuel therein, said assembly being produced by the process of pre-filling said filter casing with said fuel and affixing said cover means to said filter casing in advance of intended use of said assembly, whereby said fuel filter cartridge may be readily installed when necessary without requiring an available source of supply of fuel.

2. A pre-filled fuel filter according to claim 1 and characterized further in that said cover means comprises a cap fitted to said casing sealably covering its said open end.

3. A pre-filled fuel filter according to claim 2 and characterized further in that said cap is threadedly engaged to said casing about its said open end.

4. A pre-filled fuel filter according to claim 1 and characterized further in that said cover means includes seal means engaging said filter casing.

* * * * *

UNITED STATES PATENT AND TRADEMARK OFFICE
CERTIFICATE OF CORRECTION

PATENT NO. : 4,865,731

DATED : September 12, 1989

INVENTOR(S) : Robert D. Setzer, Sr.

It is certified that error appears in the above-identified patent and that said Letters Patent is hereby corrected as shown below:

Column 1, Line 27, after "initially" add -- filled --.

Column 2, Lines 3-4, reads "pespective" but should read -- perspective --.

Signed and Sealed this

First Day of September, 1992

Attest:

DOUGLAS B. COMER

*Attesting Officer*  *Acting Commissioner of Patents and Trademarks*